(12) United States Patent
Uesugi (10) Patent No.: US 6,341,214 B2
(45) Date of Patent: Jan. 22, 2002

(54) TRANSMISSION POWER CONTROL METHOD AND TRANSMISSION/RECEPTION APPARATUS

(75) Inventor: Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/185,507

(22) Filed: Nov. 4, 1998

(30) Foreign Application Priority Data

Nov. 13, 1997 (JP) .............................. 9-329559

(51) Int. Cl.$^7$ .................. H04Q 7/30; H04Q 7/32; H04Q 7/20
(52) U.S. Cl. .................. 455/69; 455/522; 455/67.1; 455/342; 370/342
(58) Field of Search .................. 455/69, 522, 67.1, 455/88, 127, 422, 504, 505, 506, 65, 63; 370/342

(56) References Cited

U.S. PATENT DOCUMENTS

| | | | |
|---|---|---|---|
| 4,811,421 A | * 3/1989 | Havel et al. | 370/342 |
| 5,056,109 A | * 10/1991 | Gilhousen et al. | 455/522 |
| 5,461,639 A | * 10/1995 | Wheatley, III et al. | 375/205 |
| 5,594,946 A | * 1/1997 | Menich et al. | 455/69 |
| 5,623,484 A | 4/1997 | Muszynski | 455/69 |
| 5,887,245 A | * 3/1999 | Lindroth et al. | 455/69 |
| 5,893,036 A | * 4/1999 | Trandai et al. | 455/522 |
| 5,943,610 A | * 8/1999 | Endo | 455/69 |
| 6,070,084 A | * 5/2000 | Hamabe | 455/522 |

FOREIGN PATENT DOCUMENTS

| | | |
|---|---|---|
| EP | 0462952 | 12/1991 |
| EP | 0709973 | 5/1999 |
| JP | 6-13956 | 1/1994 |
| JP | 7-58690 | 3/1995 |
| JP | 8125604 | 5/1996 |

OTHER PUBLICATIONS

An English Language abstract of JP 8–125604.
An English Language abstract of JP 6–13956.
An English Language abstract of JP 7–58690.

* cited by examiner

Primary Examiner—William Trost
Assistant Examiner—Keith Ferguson
(74) Attorney, Agent, or Firm—Greenblum & Bernstein P.L.C.

(57) ABSTRACT

Slot quality detector 121 detects reception level, and power controller inversely corresponding to reception quality 122 outputs power control information indicative of increasing transmission power in the case where the detected reception level is higher than a threshold value and of decreasing the transmission power in the case where the detected quality is lower than the threshold value. Transmission power setter 108 performs the setting of transmission power corresponding to the power control information and provides a control to transmit by the set power. That allows improving of a battery saving and moderating of the specification of amplifiers in a transmission/reception apparatus, thereby resulting in decreased interference to signals of other users in the CDMA communication.

23 Claims, 9 Drawing Sheets

TRANSMISSION POWER CONTROL METHOD AND TRANSMISSION/RECEPTION APPARATUS

BACKGROUND OF THE INVENTION

1. Field of the Invention

The present invention relates to a transmission power control method and a transmission/reception apparatus, which are used in a CDMA (Code Division Multiple Access) that is a digital radio communication and so on, capable of controlling transmission power optimally for a battery saving in a mobile station apparatus and so on.

2. Description of the Related Art

In a conventional transmission/reception apparatus using a transmission power control, the transmission power is controlled to be increased in the case where a reception quality decreases by a decrease of a reception level due to fading, or the like, and to be decreased in the case of a good reception quality.

Figure 1:
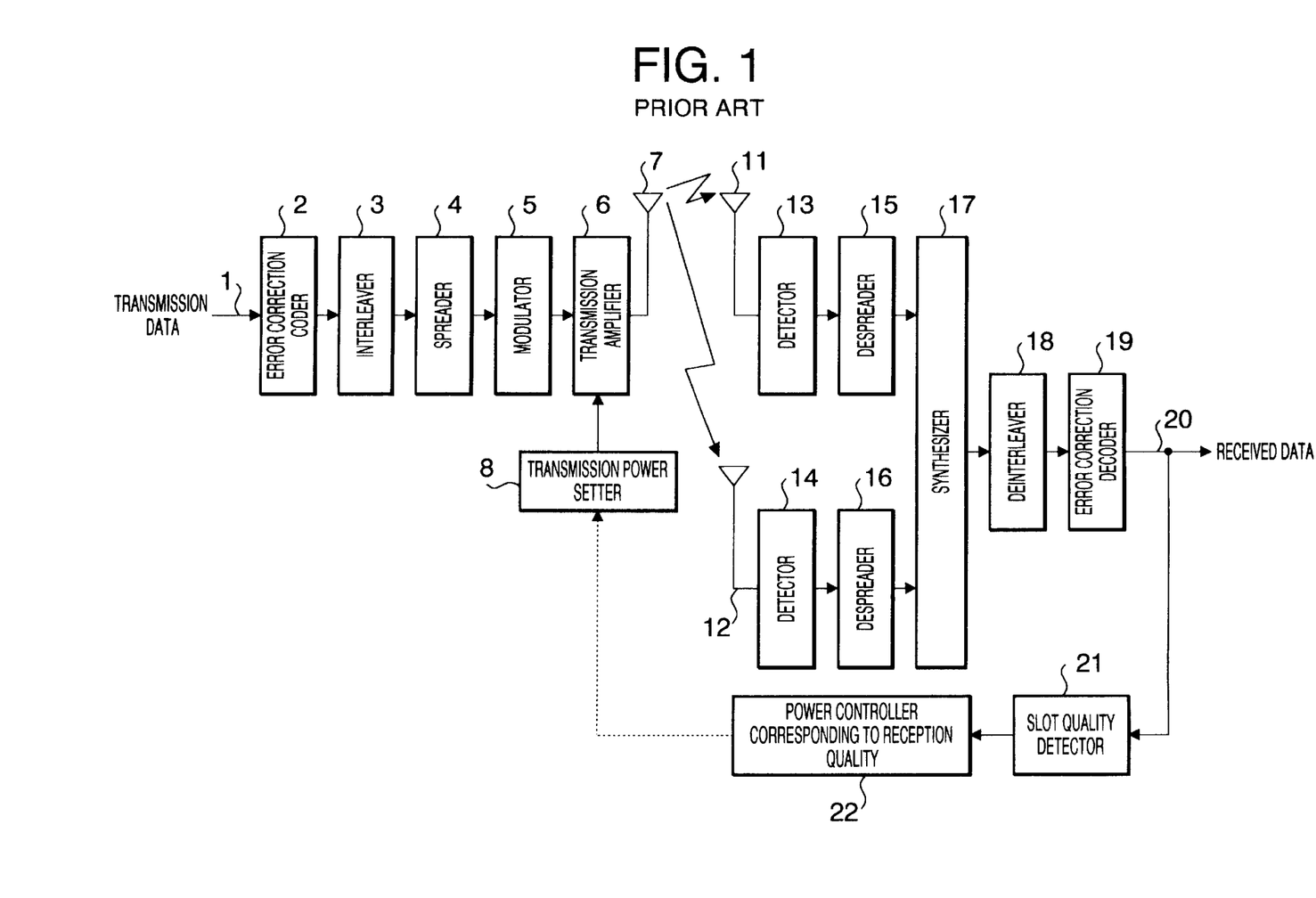
FIG. 1 is a block diagram of a conventional CDMA transmission/reception apparatus.

FIG. 1 is a block diagram illustrating a schematic configuration of a conventional CDMA transmission/reception apparatus. In FIG. 1, transmission data 1 is subjected to error correction coding in error correction coder 2, and interleaved in interleaver 3. Then the data is spread with a predetermined spreading code in spreader 4, demodulated in demodulator 5, amplified in transmission amplifier 6, and transmitted from transmission antenna 7.

At this time, transmission amplifier 6 amplifies the transmission power to the level set by transmission power setter 8. This example illustrates an example of diversity reception. Therefore, in a receiver, signals are received in first reception antenna 11 and in second reception antenna 12, detected in first detector 13 and in second detector 14 respectively, despread in first despreader 15 and in second despreader 16 respectively, then synthesized in synthesizer 17.

In the case where a plurality of paths present in a communication link due to the effect of delayed versions and so on, RAKE combining is also performed in synthesizer 17. The synthesized data are deinterleaved in deinterleaver 18, subjected to error correction in error correction decoder 19 to obtain reception data 20.

In the receiver, slot quality detector 21 detects a slot quality of reception data 20. In detail, at step ST1 of a flow chart illustrated in FIG. 2, the quality of the slot (a block of data with a certain length) is detected. At this step, as illustrated in FIG. 3, it is decided whether or not the slot quality (reception quality) 31 is higher than threshold value 32.

Figure 2:
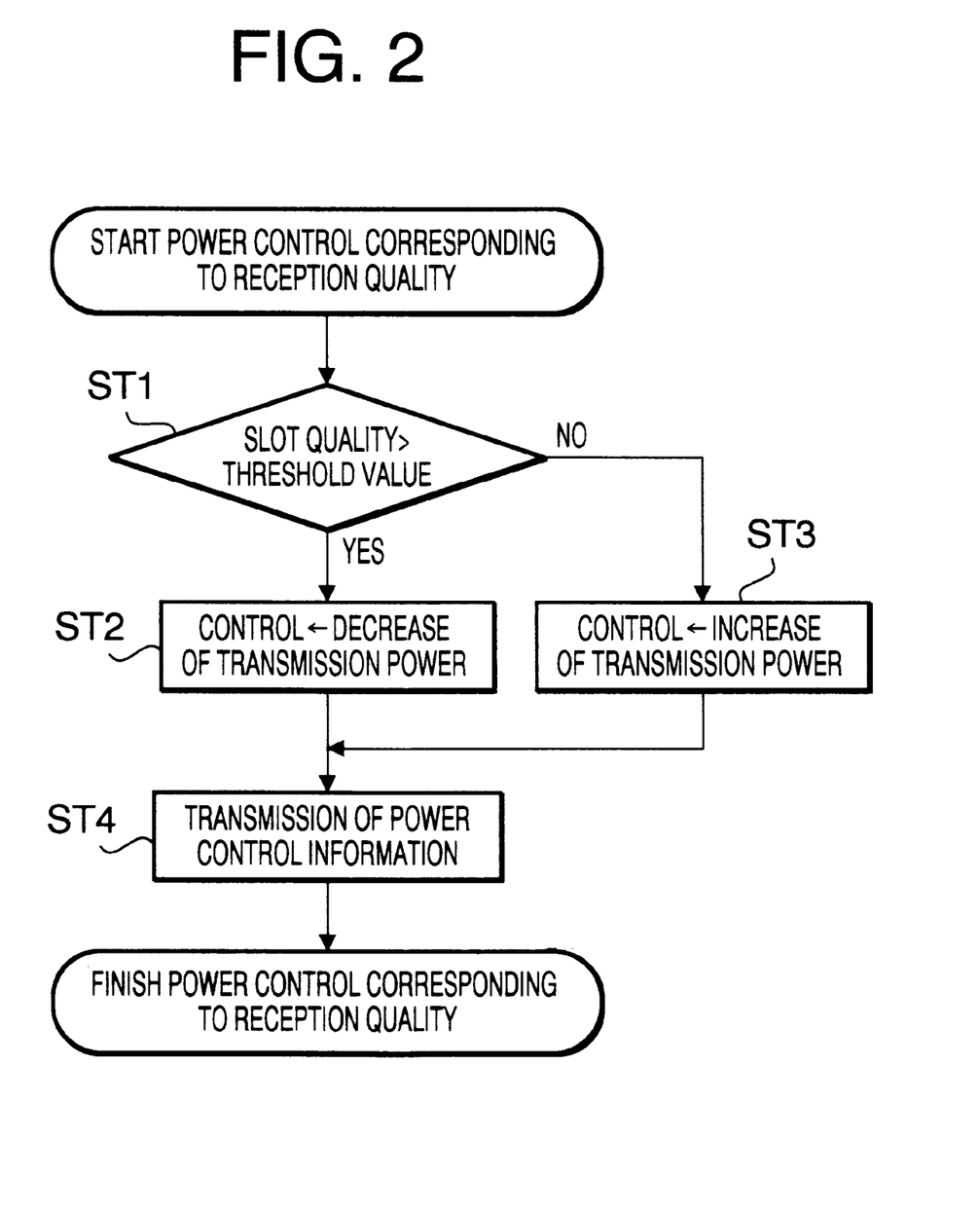
FIG. 2 is a flow chart to explain an operation of the conventional CDMA transmission/reception apparatus.

Based on the decision result, power controller corresponding to reception quality 22 (hereinafter abbreviated as power controller-CRQ 22) controls the transmission power to be decreased at step ST2 in the case where reception quality (reception level) 31 is higher (better) than threshold value 32. On the other hand, power controller-CRQ 22 controls the transmission power to be increased at step ST3 in the case where the reception quality is lower than the threshold value. In detail, power controller-CRQ 22 provides a control as illustrated by rectangle line 34 in FIG. 3. Then, at step ST4, transmits power control information is transmitted to transmission power setter 8 in a transmitter.

Figure 3:
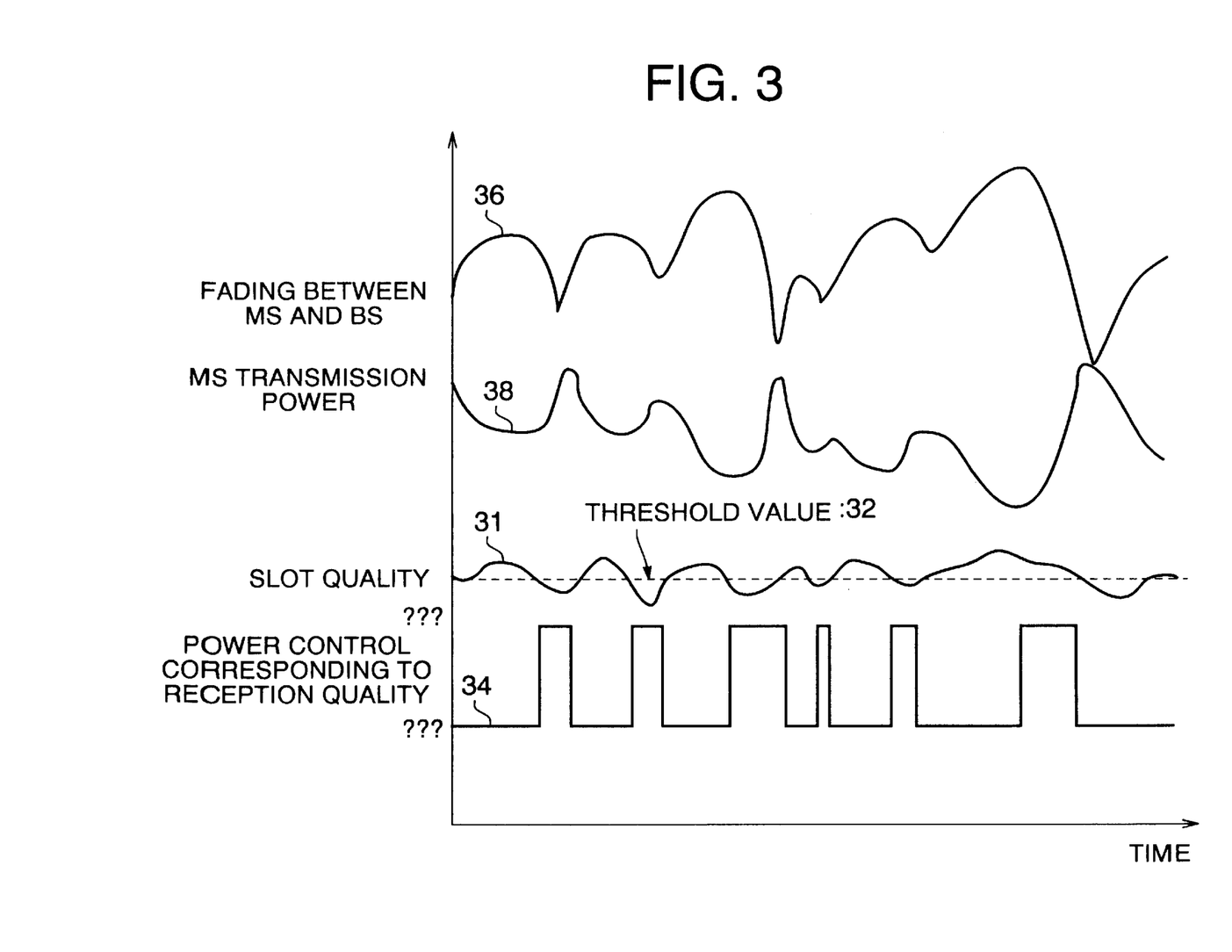
FIG. 3 is a diagram to explain a power control corresponding to reception quality in the conventional CDMA transmission/reception apparatus.

FIG. 3 is a diagram illustrating the control of power controller-CRQ 22 for reverse link signals (signals transmitted rom mobile station MS to base station BS). In FIG. 3, the fading between transmission side MS and reception side BS illustrated by curve 36 and the transmission power of mobile side MS illustrated by curve 38 are almost in inverse proportion.

Thus, it is possible to keep the reception quality almost constant, thereby allowing the improvement of the error correction ability in the case of using the error correction code having high resistance to random errors, such as convolutional code. However, there is a factor that a transmission power control error or interference volume changes, interleaving are performed to make errors further random.

According to the manner described above, the transmission power control corresponding to the reception quality always allows using of the minimum level of transmission power needed to keep the quality constant, thereby resulting in a battery saving of the mobile station. In addition, that also allows improving of system capacity because the interference volume is decreased by suppressing an unnecessary transmission power in the CDMA communication system.

However, in the conventional reception/transmission apparatus descried above, the transmission power is controlled to be increased in the case where the reception quality decreases by the decrease of the reception level due to the fading, or the like, and to be decreased in the case of the good communication quality. In the case where the reception level decreases due to the fading, it is necessary to increase the transmission level to tens of dB to transmit, which requires a transmission amplifier to have a large dynamic range. However, especially in the mobile station, the requirements for a battery life and specification on amplifiers have become severe, which makes it difficult to use an amplifier with the large dynamic range. In addition, the increase of the level makes the instant interference (to signals of other users) high in the CDMA communication.

SUMMARY OF THE INVENTION

The object of the present invention is to provide a transmission power control method and a transmission/reception apparatus capable of satisfying severe requirements for a battery life and specification on amplifiers, and of decreasing interference to signals of other users in a CDMA communication.

The present inventor was interested in the fact that an increase of transmission power did not improve an quality to an expected degree when a power level was decreased depending on level variations due to fading, and found the fact that an excess increase of the transmission power can be prevented by decreasing the transmission power to abandon such portion of communications in the case of level variations due to the fading, thus resulting in the present invention.

That is, the principle of the present invention is as follows. The transmission/reception apparatus in the reception side detects the reception level and provides the power control to the transmission side to increase the transmission power in the case where the detected reception level is higher than a threshold value, and decrease the transmission power in the case where the detected reception level is lower than the threshold value, and the transmission side thus performs a transmission by the power according to the power control.

DETAILED DESCRIPTION OF THE PREFERRED EMBODIMENTS

In a transmission power control method of the present invention, a transmission/reception apparatus in a reception side detects a reception level, and provides a power control to the transmission side to increase the transmission power in the case where the detected reception level is higher than a threshold value, and decrease the transmission power in the case where the detected reception level is lower than the threshold value, and the transmission side thus performs a transmission by the power according to the power control.

According to this method, since the transmission power control inversely corresponding to the reception quality is performed, an averaged transmission power can be decreased, thereby resulting in more battery saving of the transmission/reception apparatus than conventional apparatuses and the suppressed peak transmission power. That allows moderating of the specification of amplifiers, especially allows reducing of a cost and power consumption of the transmission/reception apparatus.

In addition, in this transmission power control method, it is preferable in the reception side to calculate a long-term reception power average and determine the threshold value corresponding to the calculation result. By this manner, it is possible to obtain the same effect as the manner described above, and prevents the transmission power from decreasing according to an attenuation due to a long-term variation, by reflecting the calculation result of the averaged reception power.

In addition, in this transmission power control method, it is preferable in the transmission side to calculate an average of transmission power control information and determine the transmission power corresponding to the calculation result. By this manner, it is possible to obtain the same effect as the manner described above, and perform further effective transmission power control by calculating the averaged transmission power.

In addition, the transmission/reception apparatus of the present invention comprises a receiver having a reception quality detecting section for detecting the reception quality and a power control inversely corresponding to reception quality section for outputting power control information of increasing the transmission power in the case where the detected reception level is higher than the threshold value and decreasing the transmission power in the case where the reception level is lower than the threshold value, and also comprises a transmitter having a transmission power setting section for setting the transmission power corresponding to the power control information and providing a control to transmit according to the set power.

According to the constitution, since the transmission power control inversely corresponding to reception quality is performed, the averaged transmission power can be decreased, thereby resulting in more battery saving of the transmission/reception apparatus than conventional apparatuses and the suppressed peak transmission power. That allows moderating of the specification of amplifiers, especially allows reducing of a cost and power consumption of the transmission/reception apparatus.

In addition, in this transmission/reception apparatus, the receiver comprises an averaged reception power calculating section for calculating the long-term reception power average, and the power control inversely corresponding to reception quality section determines the threshold value corresponding to the calculation result.

According to this manner, it is possible to obtain the same effect as the manner described above, and prevents the transmission power from decreasing according to the attenuation due to the long-term variation, by reflecting the calculation result of the averaged reception power.

In addition, in the transmission/reception apparatus, the transmitter comprises an averaged transmission power calculating section for obtaining an average of the power control information, and the transmission power setting section determines the transmission power corresponding to the calculation result. According to the constitution, it is possible to obtain the same effect as the manner described above, and perform further effective transmission power control by calculating the averaged transmission power.

In addition, it is preferable in the transmission/reception apparatus that the transmitter and the receiver comprise the constitutions to perform the CDMA communication. According to the constitution, in the CDMA communication, it is possible to improve the system capacity more than the conventional constitution because the decrease of the averaged transmission power results in the decrease of interference volume.

Hereinafter, the embodiments of the present invention are explained with reference to attached drawings in detail.

(First Embodiment)

Figure 4:
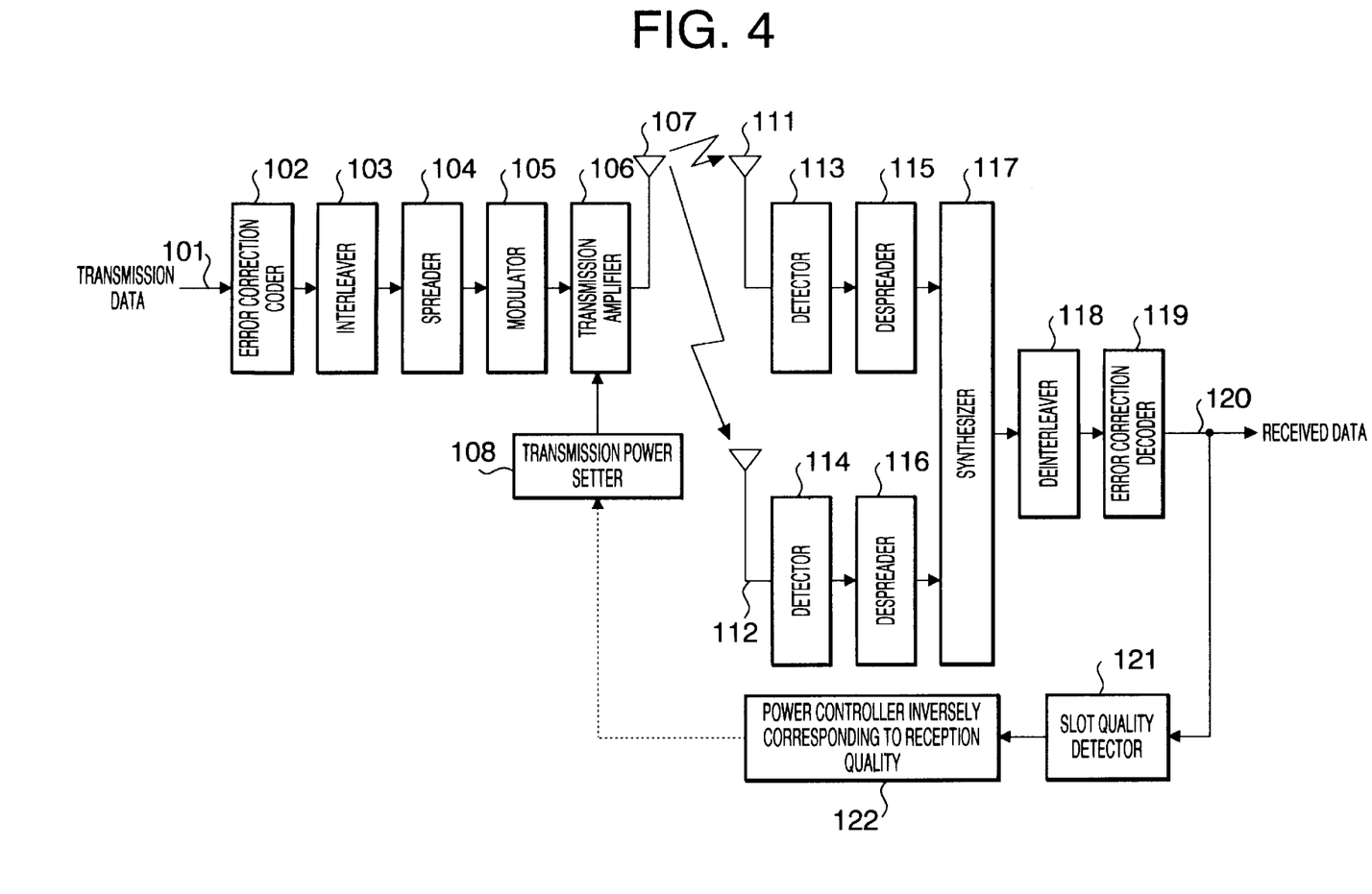
FIG. 4 is a block diagram of a CDMA transmission/reception apparatus according to the first embodiment of the present invention.

FIG. 4 illustrates a block diagram of a CDMA transmission/reception apparatus in the first embodiment of the present invention. In FIG. 4, transmission data 101 is subjected to error correction coding in error correction coder 102, and interleaved in interleaver 103. Then the data are spread with a spreading code in spreader 104, demodulated in demodulator 105, amplified in transmissions amplifier 106, and transmitted from transmission antenna 107.

At this time, transmission amplifier 106 amplifies the transmission power to the level set by transmission power setter 108. This example illustrates an example of diversity reception. Therefore, in a receiver, signals are received in first reception antenna 111 and in second reception antenna 112, detected in first detector 113 and in second detector 114 respectively, despread in first despreader 115 and in second despreader 116 respectively, then synthesized in synthesizer 17.

In the case where a plurality of paths present in a communication link due to the effect of delayed versions and so on, RAKE combining is also performed in synthesizer 117. The synthesized data are deinterleaved in deinterleaver 118, subjected to error correction in error correction decoder 119 to obtain reception data 120.

In the receiver, slot quality detector 121 detects a slot quality of reception data 120. In detail, at step ST101 of a flow chart illustrated in FIG. 5, the quality of the slot (a block of data with a certain length) is detected. At this step, it is decided whether or not the slot quality (reception quality) 201 is higher than threshold value 202.

Figure 5:
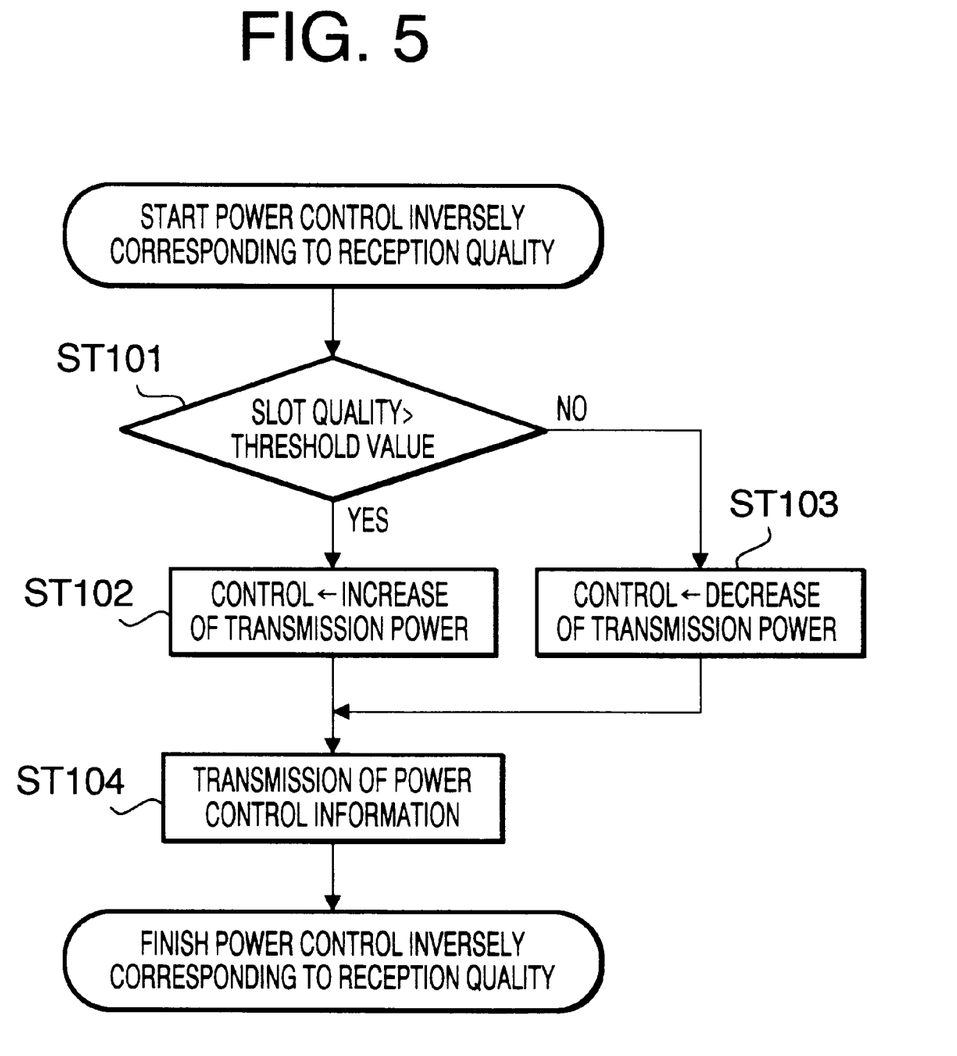
FIG. 5 is a flow chart to explain an operation of the CDMA transmission/reception apparatus according to the above embodiment.

Based on the decision result, power control inversely corresponding to reception quality section 122 (hereinafter abbreviated as power control-ICRQ 122) generates the power control information so as to increase the transmission power at step ST102 as illustrated by rectangle line 204 in FIG. 6 in the case where reception quality (reception level) 201 is higher (better) than threshold value 202 and to decrease the transmission power at step ST103 in the case where the reception quality is lower than threshold value 202. Then at step ST104, the power control information is transmitted to transmission power setter 108 in the transmitter.

Figure 6:
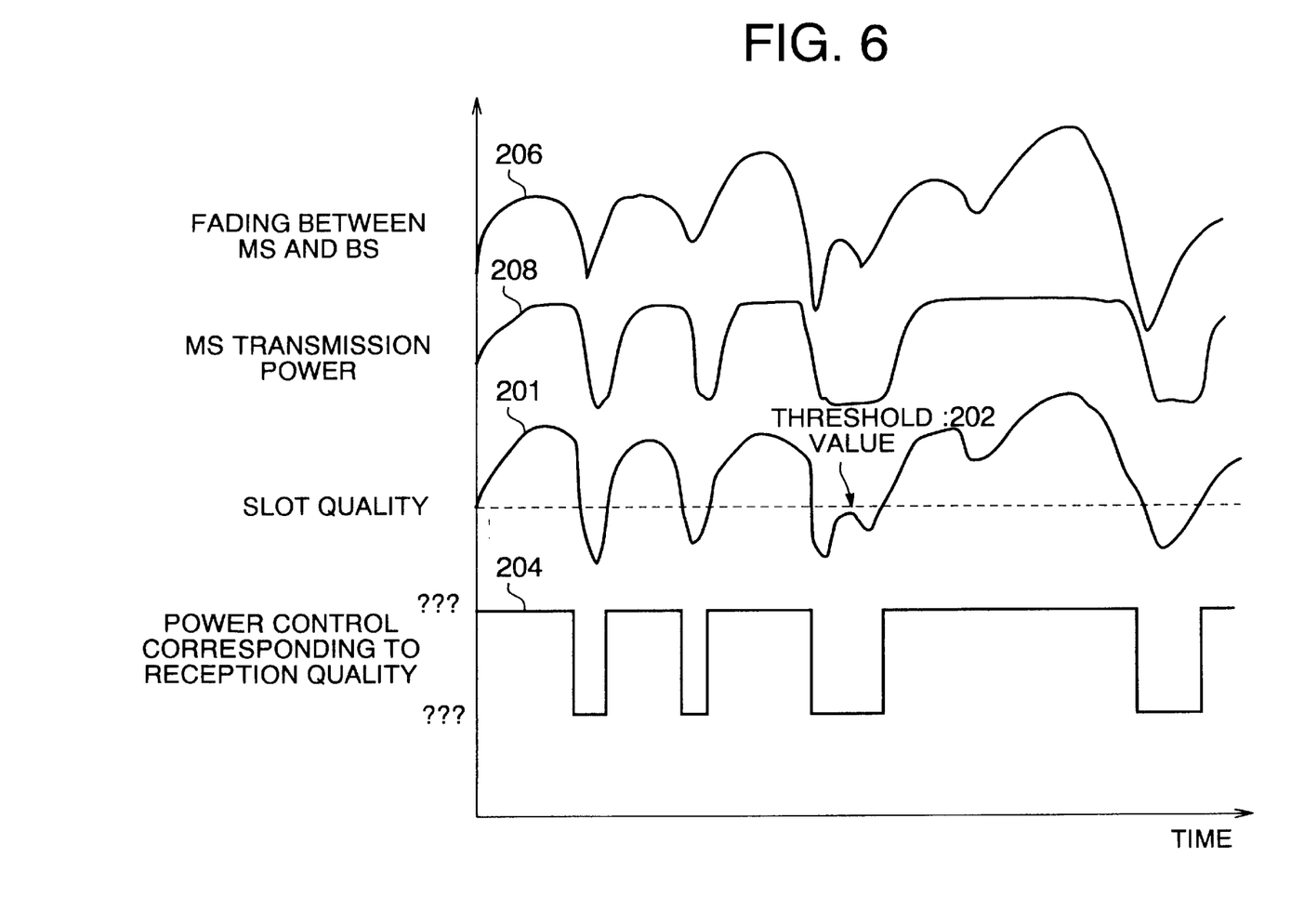
FIG. 6 is a diagram to explain a power control inversely corresponding to reception quality in the CDMA transmission/reception apparatus according to the above embodiment.

A logic diagram of power control-ICRQ section 122 represented by the square wave 204 is in FIG. 6 shows an example of reverse link signals (signals transmitted from mobile station MS to base station BS). The transmission power in mobile side MS illustrated by curve 208 indicates almost similar variations with the fading between transmission side MS and reception side BS illustrated by curve 206.

Two kinds of reception qualities thus are available, i.e., extremely good reception quality and extremely poor reception quality. In the case of using the error correction code having high resistance to random errors, such as convolutional code, the correction ability is hold by interleaving to make errors random.

When the transmission power control illustrated in FIG. 6 is performed, it is not necessary to transmit by high power in the case where the reception level more than a certain level is kept by the level variation due to fading. Therefore, transmission power setter 108 controls the transmission power (under a certain power level) not to transmit in the receiver by higher power than a certain power level after the power level reaches he certain power level even in the case where power control-ICRQ section 122 instructs to increase the transmission power.

The maximum MS transmission power thus is controlled under the power level that is too high. On the other hand, in the case where the level is under the certain level by the level variation due to fading (the level variation due to fading is under the certain level) it is not reasonable to transmit by compulsory high transmission power because good enough quality may not be obtained. In such case, the transmission power is decreased to abandon such poor quality, thereby reducing the transmission power.

In this case, error correction decoder 119 extremely lowers the likelihood of soft decision decoding. The case of performing the error correction and interleaving is equivalent to the case of puncture, and a correct demodulation is performed in the case of a low degree of the error correction and the interleaving. Thus, by setting in transmission power setter 108 the transmission power with the transmission power value controlled by power controller-ICRQ 122, the averaged transmission power and the peak transmission power is reduced.

In a transmission of packets and so on, the packet that could not be transmitted is retransmitted. It is supposed that the effect of decreasing the entire transmission power is more effective than the effect of increasing the transmission power to retransmit, and also supposed that FER (Frame Error Rate) is less than random errors by not performing the interleaving.

Thus, according to the first embodiment, since the transmission power control inversely corresponding to reception quality is performed along with interleaving, error correction and so on, the averaged transmission power can be reduced. Therefore, the battery saving of the mobile station is achieved more than the conventional apparatuses and the peak transmission power is suppressed. That allows moderating of the specification of amplifiers, further reducing of the cost and power consumption of the transmission/reception apparatus. In addition, it is possible to improve the system capacity more than the conventional constitution because the decrease of the averaged transmission power results in the decrease of interference (volume) in the CDMA system.

(Second Embodiment)

Figure 7:
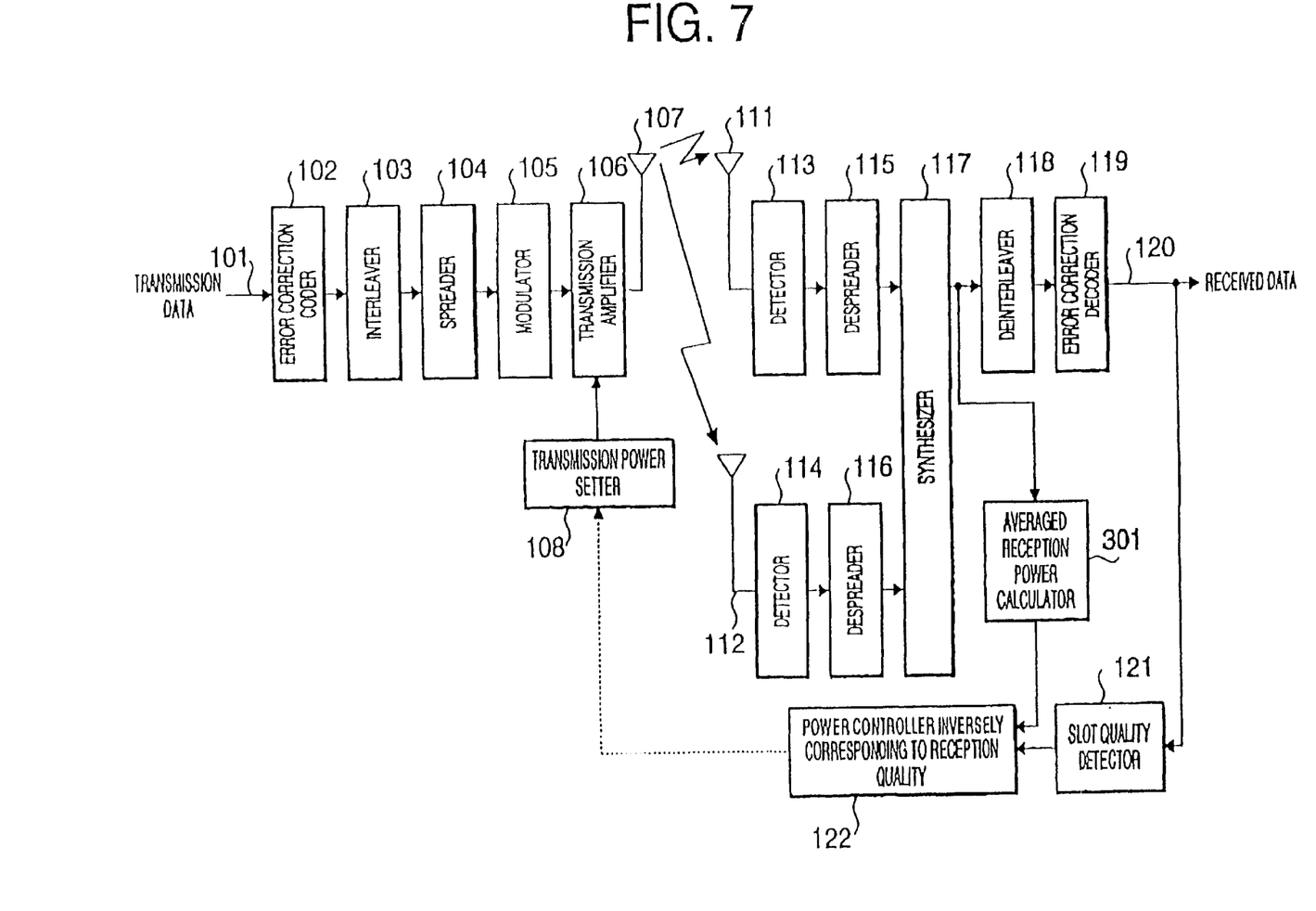
FIG. 7 is a block diagram of a CDMA transmission/reception apparatus according to the second embodiment of the present invention.

FIG. 7 illustrates a block diagram of a CDMA transmission/reception apparatus according to the second embodiment of the present invention. In addition, in the second embodiment of the present invention illustrated in FIG. 7, a section corresponding to each section in the first embodiment illustrated in FIG. 4 is assigned the same symbol to omit the explanation.

The second embodiment illustrated in FIG. 7 is characterized by having averaged reception power calculator 301 for calculating a long-term variations of the reception level caused by an attenuation of communication distance to be reflected in a threshold value in power controller-ICRQ 302 so that the appropriate transmission power control is performed.

Figure 8:
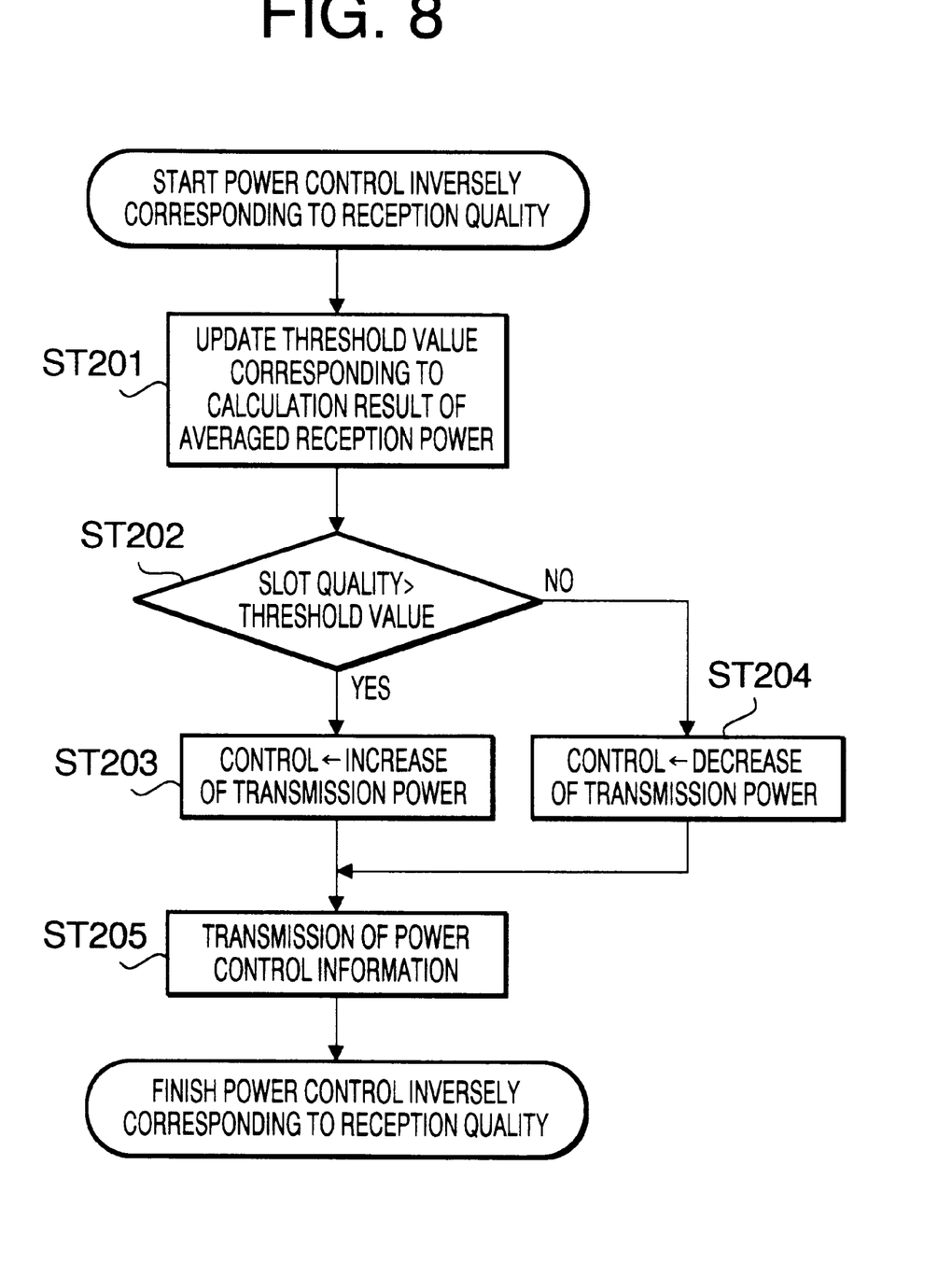
FIG. 8 is a flow chart to explain an operation of the CDMA transmission/reception apparatus according to the above embodiment.

That is, in the receiver, at step ST201 illustrated in the operation flow chart of the power control inversely corresponding to reception quality in FIG. 8, averaged reception power calculator 301 calculates, using data output from synthesizer 117, the long-term variations of the reception level caused by the attenuation of communication distance and so on, and updates the threshold value of power controller-ICRQ 122 corresponding to the calculation result. The update is performed to increase the threshold value when the calculation value is high, which is assumed that the attenuation is low, and to decrease the threshold value when the calculation value is low.

Then, slot quality detector 121 detects a slot quality based on reception data 120 at step ST202, and decides whether or not the slot quality is higher than the threshold value.

Based on the decision result, power controller-ICRQ 122 generates the power control information indicative of increasing the transmission power at step ST203 in the case where the reception quality is higher (better) than the threshold value, and of decreasing the transmission power at step ST204 in the case where the reception quality is lower than the threshold value. Then, at step ST205, the power control information is transmitted to transmission power setter 108 in the transmitter.

When a cell radius is large, it is supposed that the long-term level variation generates by a difference of communication distance and shadowing. In such case, the transmission power decreases as the attenuation of the long-term variation if the threshold value of power controller-ICRQ 122 is fixed in the same way as the first embodiment.

However, the above problem that the transmission power decreases as the attenuation of the long-term variation is solved in the same way as the second embodiment, where averaged reception power calculator 301 obtains the long-term averaged reception level to update the threshold value. The more effective transmission control than the first embodiment is thus performed.

As described above, according to the second embodiment, it is possible to obtain the same effect as the first embodiment, and also cancel the effect of decreasing the transmission power as the attenuation of the long-term variation by reflecting the calculation result of the averaged reception power.

(Third Embodiment)

Figure 9:
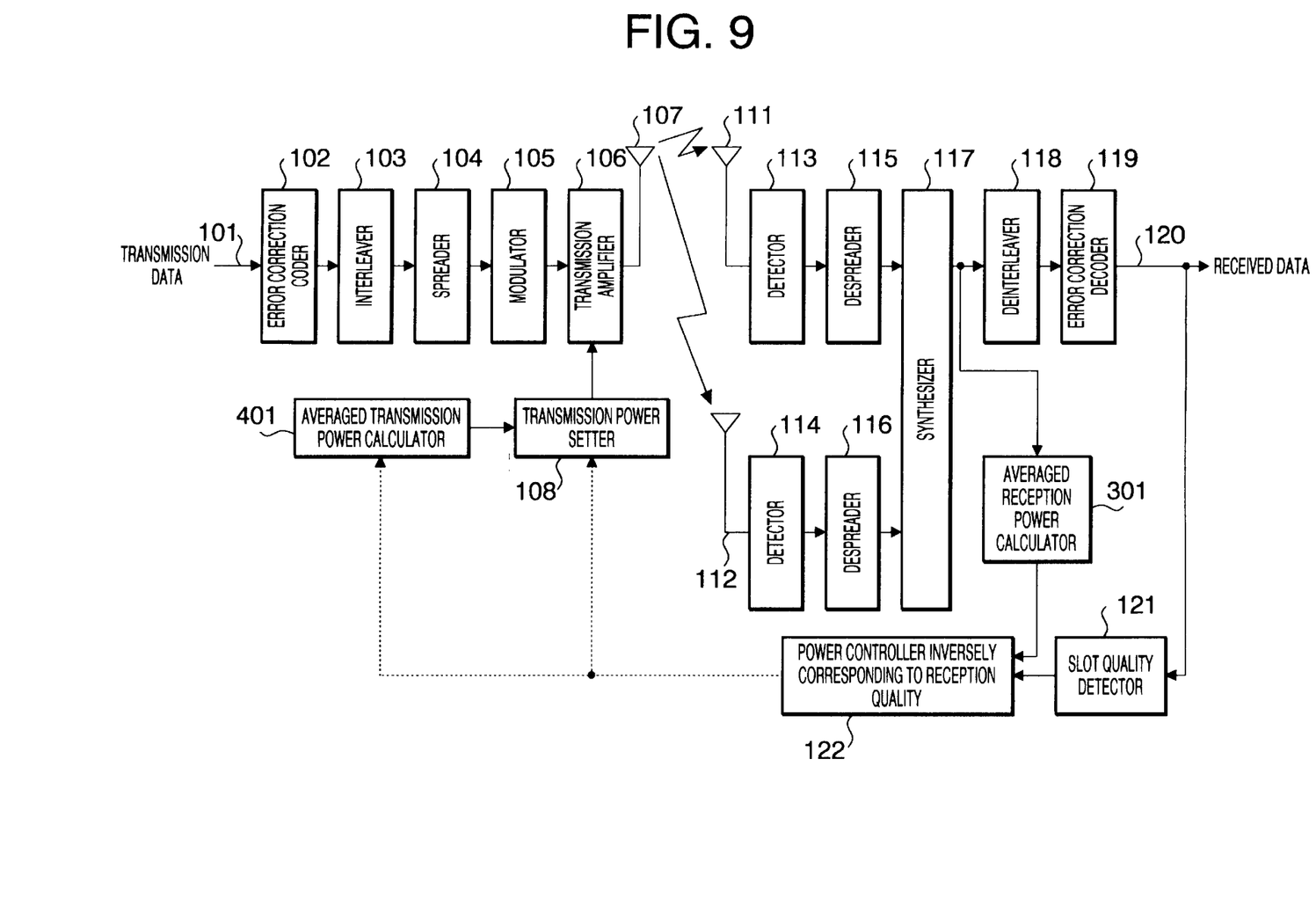
FIG. 9 is a block diagram of a CDMA transmission/reception apparatus according to the third embodiment of the present invention.

FIG. 9 illustrating a block diagram of a CDMA transmission/reception apparatus according to the third embodiment of the present invention. In addition, in the third embodiment of the present invention illustrated in FIG. 9, a section corresponding to each section in the second embodiment illustrated in FIG. 7 is assigned the same symbol to omit the explanation.

The third embodiment illustrated in FIG. 9 is characterized by having averaged transmission power calculator 401 for deciding an averaged transmission power not to incline the control corresponding to the power control information from power controller-ICRQ 122 to transmit to transmission power setter 108 so that the upper limit of the transmission power is decided.

That is, in the receiver, slot quality detector 121 detects a slot quality of reception data 120. According to the result, power controller-ICRQ 122 generates the power control information indicative of increasing the transmission power in the case where the reception quality is higher (better) than a threshold value, and of decreasing the transmission power in the case where the reception quality is lower than the threshold value, and transmits the power control information to transmission power setter 108 and averaged transmission power calculator 401 in the transmitter.

Thus, averaged transmission power calculator 401 decides the averaged transmission power not to incline the control from power controller-ICRQ 122 to transmit to transmission power setter 108, thereby deciding the upper limit of the transmission power.

That is, in the transmitter, averaged transmission power calculator 401 detects the incline of the control from power controller-ICRQ 122, then increases the upper limit of the transmission power of transmission power setter 108 by deciding that the communication distance is getting bigger in the case of (inclining to increase the power) the continuous controls indicative of increasing the power level from power controller-ICRQ 122, and decreases the upper limit of the transmission power of transmission power setter 108 by deciding that the communication distance is getting smaller in the case of (inclining to decrease the power) the continuous controls indicative of decreasing the power level from power controller-ICRQ 122. The more effective transmission power control is thus performed than the second embodiment.

As described above, according to the third embodiment, it is possible to obtain the same effect as the second embodiment, and to perform further effective transmission power control than the second embodiment by calculating the averaged transmission power.

The apparatuses according to the first embodiment to the third embodiment described above are applicable to communication terminal apparatuses as mobile station apparatuses and base station apparatuses in a radio communication system. In addition, the first embodiment to the third embodiment described above explain about the case of applying the transmission/reception apparatus of the present invention in the CDMA communication system, however the transmission/reception apparatus of the present invention is applicable to the other communications besides the CDMA. In addition, the first embodiment to the third embodiment described above explain about the case of using the reception level as the reception quality, however in the present invention, SNR (Signal to Noise ratio), CNR (Carrier to Noise ratio), SIR (Signal to Interference ratio), FER (Frame Error Rate) BER (Bit Error Rate), etc. are applicable as the reception quality.

As appeared in the above-mentioned explanation, it is possible in the reception/transmission apparatus to improve the battery life and moderate the specification on amplifiers, thereby decreasing interference to signals of other users in the CDMA communication.

What is claimed is:

1. A transmission of power control method in a CDMA communication system comprising:

detecting a quality of a signal received from a communication unit;

generating power control information indicative of increasing transmission power of the communication unit when the detected quality is higher than a threshold value and of decreasing said transmission power when said detected quality is lower than said threshold value; and transmitting the power control information.

2. The transmission power control method according to claim 1, further comprising calculating an average of reception power for a predetermined interval and determining the threshold value corresponding to the calculation result.

3. The transmission power control method according to claim 1 wherein the received signal is received from a communication unit and the power control information is indicative of increasing transmission power of the communication unit when the detected quality of the received signal is higher than the threshold value and of decreasing the transmission power of the communication unit when the detected quality of the received signal is lower than the threshold value.

4. A radio communication apparatus in a CDMA communication system, said apparatus comprising:

a quality detecting system that detects a quality of a signal received from a communication unit;

a power control system that outputs power control information indicative of increasing transmission power of the communication unit when the detected quality of the received signal is higher than a threshold value and of decreasing said transmission power of the communication unit when said detected quality of the received signal is lower than said threshold value.

5. The radio communication apparatus according to claim 4, said apparatus further comprising an averaged reception power calculating system that calculated an average of reception power for a predetermined interval, wherein said power control system determines the threshold value corresponding to the calculation result.

6. The transmission power control method according to claim 4 wherein the received signal is received from a communication unit and the power control information output by the power control system is indicative of increasing transmission power of the communication unit when the detected quality of the received signal is higher than the threshold value and of decreasing the transmission power of the communication unit when the detected quality of the received signal is lower than the threshold value.

7. A radio communication apparatus in a CDMA communication system, said apparatus comprising:
- a reception system that receives power control information indicative of increasing transmission power of a transmitted signal when a quality of the transmitted signal is higher than a threshold value and of decreasing said transmission power of the transmitted signal when said quality is lower than said threshold value;
- a transmission power setting system that sets the transmission power corresponding to said power control information; and
- a transmission system that performs transmission by the set power.

8. The radio communication apparatus according to claim 7, said apparatus further comprising an averaged reception power calculating system that obtains an average of said power control information, wherein said transmission power setting system determines the transmission power corresponding to said calculation result.

9. The transmission power control method according to claim 7 wherein the power control information received by said reception system is indicative of increasing the transmission power of a transmitted signal when the quality of the transmitted signal is higher than the threshold value and of decreasing the transmission power of the transmitted signal when the detected quality of the transmitted signal is lower than the threshold value.

10. A transmission/reception apparatus in a CDMA communication system, said apparatus comprising:
- a receiver comprising a quality detecting system that detects a quality of a received signal, and a power control system that outputs power control information indicative of increasing transmission power when the detected quality is higher than a threshold value and of decreasing said transmission power when said detected quality is lower than said threshold value; and
- a transmitter comprising a reception system that receives said power control information, a transmission power setting system that sets the transmission power according to said power control information, and a transmission system that performs a transmission by the set power;
- wherein the received signal, the quality of which is detected by said quality detecting system, is transmitted by said transmitter.

11. The transmission/reception apparatus according to claim 10, said apparatus further comprises an averaged reception power calculating system that calculates an average of reception power for a predetermined interval, wherein said power control system determines the threshold value corresponding to the calculation result.

12. The transmission/reception apparatus according to claim 10, said apparatus further comprises an averaged transmission power calculating system that determines an average of said power control information, wherein said transmission power setting system determines the transmission power corresponding to said calculation result.

13. The transmission power control method according to claim 10, wherein the received signal, the quality of which is detected by said quality detecting system, is transmitted by said transmitter.

14. A base station apparatus having a transmission/reception apparatus in a CDMA communication system, said transmission/reception apparatus comprising:
- a receiver comprising a quality detecting system that detects a qualify of a received signal, and a power control system that outputs power control information indicative of increasing transmission power when the detected quality is higher than a threshold value and of decreasing said transmission power when said detected quality is lower than said threshold value; and
- a transmitter comprising a reception system that receives said power control information, a transmission power setting system that sets the transmission power corresponding to said power control information, and a transmission system that performs transmission by the set power;
- wherein the received signal, the quality of which is detected by said quality detecting system, is transmitted by said transmitter.

15. The transmission power control method according to claim 14, wherein the received signal, the quality of which is detected by said quality detecting system, is transmitted by said transmitter.

16. A communication terminal apparatus having a transmission/reception apparatus in a CDMA communication system, said transmission/reception apparatus comprising:
- a receiver comprising a quality detecting system that detects a quality of a received signal and a power control system that outputs power control information indicative of increasing transmission power when the detected quality is higher than a threshold value and of decreasing said transmission power when said detected quality is lower than said threshold value; and
- a transmitter comprising a reception system that receives said power control information, a transmission power setting system that sets a transmission power corresponding to said power control information, and a transmission system that performs a transmission by the set power;
- wherein the received signal, the quality of which is detected by said quality detecting system, is transmitted by said transmitter.

17. The transmission power control method according to claim 16, wherein the received signal, the quality of which is detected by said quality detecting system, is transmitted by said transmitter.

18. A transmission power control method in a CDMA communication system comprising:
- detecting a quality of a signal received from a transmitter;
- generating power control information indicative of increasing transmission power of the transmitter to improve the quality of the signal when the detected quality is higher than a threshold value and of decreasing the transmission power when the detected quality is lower than the threshold value; and
- transmitting the power control information.

19. A radio communication apparatus in a CDMA communication system, the apparatus comprising:
- a quality detecting system that detects a quality of a signal received from a transmitter; and
- a power control system that outputs power control information indicative of increasing transmission power of the transmitter to improve the quality of the signal when the detected quality of the received signal is higher than a threshold value and of decreasing the transmission power when the detected quality of the received signal is lower than the threshold value.

20. A radio communication apparatus in a CDMA communication system, the apparatus comprising:
- a reception system that receives power control information indicative of increasing transmission power of a signal to improve a quality of the signal when the signal quality in a receiver is higher than a threshold value and of decreasing the transmission power when the signal quality is lower than the threshold value;
- a transmission power setting system that sets the transmission power according to the power control information; and
- a transmission system that transmits at the set transmission power.

21. A transmission/reception apparatus in a CDMA communication system, the apparatus comprising, the apparatus comprising:
- a receiver comprising a signal quality detector for detecting a quality of a signal received from a transmitter; and a power control system that outputs power control information indicative of increasing transmission power of the transmitter when the detected quality of the received signal is higher than a threshold value and of decreasing the transmission power when the detected quality of the received signal is lower than the threshold value; and
- a transmitter comprising a reception system that receives the power control information; a transmission power setting system that sets the transmission power according to the power control information; and a transmission system that transmits at the set transmission power.

22. A base station apparatus having a transmission/reception apparatus, in a CDMA communication system, the transmission/reception apparatus comprising:
- a receiver comprising a quality detecting system that detects a quality of a signal received from a transmitter; and a power control system that outputs power control information indicative of increasing transmission power of the transmitter to improve the quality when the detected quality of the received signal is higher than a threshold value and of decreasing the transmission power when the detected quality of the received signal is lower than the threshold value; and
- a transmitter comprising a reception system that receives the power control information; a transmission power setting system that sets the transmission power according to the power control information; and a transmission system that transmits at the set transmission power.

23. A communication terminal apparatus having a transmission/reception apparatus in a CDMA communication system, the transmission/reception apparatus comprising:
- a receiver comprising a quality detecting system that detects a quality of a signal received from a transmitter; and a power control system that outputs power control information indicative of increasing transmission power of the transmitter when the detected quality of the received signal is better than a threshold quality and of decreasing the transmission power when the detected quality of the received signal is worse than the threshold quality; and
- a transmitter comprising a reception system that receives the power control information; a transmission power setting system that sets the transmission power according to the power control information; and a transmission system that transmits at the set transmission power.

* * * * *

UNITED STATES PATENT AND TRADEMARK OFFICE
CERTIFICATE OF CORRECTION

PATENT NO. : 6,341,214 B2
DATED : January 22, 2002
INVENTOR(S) : M. Uesugi

It is certified that error appears in the above-identified patent and that said Letters Patent is hereby corrected as shown below:

<u>Title page,</u>
Item [57], ABSTRACT,
Line 2, after "detects" insert -- a --.

<u>Column 10,</u>
Line 2, "qualify" should be -- quality --.

<u>Column 11,</u>
Lines 15-16, delete "the apparatus comprising," (first occurrence).

Signed and Sealed this

Third Day of December, 2002

JAMES E. ROGAN
*Director of the United States Patent and Trademark Office*